United States Patent
Yanagi (10) Patent No.: US 7,957,637 B2
(45) Date of Patent: Jun. 7, 2011

(54) IMAGING DEVICE, IMAGING METHOD AND PROGRAM

(75) Inventor: Kazunori Yanagi, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 12/831,857

(22) Filed: Jul. 7, 2010

(65) Prior Publication Data

US 2010/0272425 A1   Oct. 28, 2010

Related U.S. Application Data

(62) Division of application No. 11/527,289, filed on Sep. 26, 2006.

(30) Foreign Application Priority Data

Sep. 30, 2005   (JP) .................................. 2005-285739

(51) Int. Cl.
*G03B 15/05*   (2006.01)
(52) U.S. Cl. ...................................... 396/167
(58) Field of Classification Search .................. 396/166, 396/167, 205, 206; 348/370, 371
See application file for complete search history.

(56) References Cited

U.S. PATENT DOCUMENTS

| | | | |
|---|---|---|---|
| 3,675,547 A * | 7/1972 | Uchiyama et al. | 396/167 |
| 4,005,444 A | 1/1977 | Uchiyama et al. | |
| 4,083,059 A | 4/1978 | Tsunekawa et al. | |
| 4,464,039 A | 8/1984 | Ishida | |
| 4,549,801 A | 10/1985 | Winter | |
| 4,974,093 A * | 11/1990 | Murayama et al. | 348/308 |
| 4,998,128 A | 3/1991 | Coltman et al. | |
| 5,343,268 A | 8/1994 | Takahashi | |
| 5,600,389 A | 2/1997 | Saegusa | |
| 6,167,202 A | 12/2000 | Fukui | |
| 6,295,413 B1 | 9/2001 | Ogasawara | |
| 6,427,051 B1 | 7/2002 | Hosokawa et al. | |
| 6,930,716 B2 | 8/2005 | Yoshida | |
| 7,071,987 B1 | 7/2006 | Tanaka | |
| 7,145,602 B2 | 12/2006 | Shiga | |

(Continued)

FOREIGN PATENT DOCUMENTS

CN   1520163 A   8/2004

(Continued)

OTHER PUBLICATIONS

Japanese Office Action (and English translation thereof) dated Mar. 16, 2010, issued in counterpart Japanese application No. 2005-285739.

(Continued)

*Primary Examiner* — W. B. Perkey
(74) *Attorney, Agent, or Firm* — Holtz, Holtz, Goodman & Chick, PC (57) ABSTRACT

An imaging device equipped with an imaging system includes an imaging lens optical system which images an object, a flash emitting unit which synchronizes imaging in the imaging system to emit a flash having not less than a prescribed luminance in a charged state not less than a prescribed charged state by power to be charged, and a control unit which determines a charging amount of the charged state of the flash emitting unit and which controls imaging to be performed by using the flash emitting unit with an imaging sensitivity of the imaging lens optical system set in accordance with the charging amount of the charged state in imaging by the imaging lens optical system.

6 Claims, 7 Drawing Sheets

U.S. PATENT DOCUMENTS

| | | | |
|---|---|---|---|
| 7,218,353 B2 * | 5/2007 | Wakabayashi | 348/362 |
| 7,336,307 B2 | 2/2008 | Takaiwa | |
| 7,509,042 B2 * | 3/2009 | Mori et al. | 396/155 |
| 2002/0006278 A1 | 1/2002 | Kitani | |
| 2003/0117519 A1 * | 6/2003 | Wakabayashi | 348/364 |
| 2003/0146986 A1 | 8/2003 | Calderwood | |
| 2004/0189822 A1 | 9/2004 | Shimada | |
| 2004/0252217 A1 | 12/2004 | Battles et al. | |
| 2005/0157206 A1 | 7/2005 | Kato | |
| 2005/0212955 A1 | 9/2005 | Craig et al. | |
| 2007/0077053 A1 | 4/2007 | Yanagi | |
| 2007/0139548 A1 * | 6/2007 | Sugimoto et al. | 348/371 |

FOREIGN PATENT DOCUMENTS

| | | |
|---|---|---|
| JP | 2000-162679 A | 6/2000 |
| JP | 2001-223943 A | 8/2001 |
| JP | 2004-187078 A | 7/2004 |
| JP | 2005-204120 A | 7/2005 |

OTHER PUBLICATIONS

Korean Office Action (and English translation thereof) dated Dec. 26, 2007, issued in a counterpart Korean Application.

Chinese Office Action (and English translation thereof) dated Jan. 4, 2008, issued in a counterpart Chinese Application.

Yanagi, Kazunori; "Imaging Device, Imaging Method and Program"; U.S. Appl. No. 11/527,289, filed Sep. 26, 2006.

* cited by examiner

| ELECTRIC CHARGE AMOUNT | FLASH | SENSITIVITY |
|---|---|---|
| 330V | EMIT | ISO50 |
| LOWER THAN 330V AND NOT LOWER THAN 310V | EMIT | ISO100 |
| LOWER THAN 310V AND NOT LOWER THAN 290V | EMIT | ISO200 |
| LOWER THAN 290V AND NOT LOWER THAN 270V | EMIT | ISO400 |
| LOWER THAN 270V AND NOT LOWER THAN 250V | EMIT | ISO800 |
| LOWER THAN 250V AND NOT LOWER THAN 230V | EMIT | ISO1600 |
| LOWER THAN 230V AND NOT LOWER THAN 220V | EMIT | ISO1600 |
| LOWER THAN 220V | DOES NOT EMIT | ISO1600 |

| ELECTRIC CHARGE AMOUNT | FLASH | SENSITIVITY | S VALUE (sec) |
|---|---|---|---|
| 330V | EMIT | ISO50 | 1/60 |
| LOWER THAN 330V AND NOT LOWER THAN 310V | EMIT | ISO100 | 1/30 |
| LOWER THAN 310V AND NOT LOWER THAN 290V | EMIT | ISO200 | 1/15 |
| LOWER THAN 290V AND NOT LOWER THAN 270V | EMIT | ISO400 | |
| LOWER THAN 270V AND NOT LOWER THAN 250V | EMIT | ISO800 | |
| LOWER THAN 250V AND NOT LOWER THAN 230V | EMIT | ISO1600 | |
| LOWER THAN 230V AND NOT LOWER THAN 220V | EMIT | ISO1600 | |
| LOWER THAN 220V | DOES NOT EMIT | ISO1600 | |

| ELECTRIC CHARGE AMOUNT | ∞ (10 [m]~) | ~10 [m] | ~5 [m] | ~1 [m] |
|---|---|---|---|---|
| 330V | ※ISO1600 | ISO50 | ISO50 | ISO50 |
| LOWER THAN 330V AND NOT LOWER THAN 310V | ↑ | ISO100 | ISO50 | ISO50 |
| LOWER THAN 310V AND NOT LOWER THAN 290V | ↑ | ISO200 | ISO50 | ISO50 |
| LOWER THAN 290V AND NOT LOWER THAN 270V | ↑ | ISO400 | ISO100 | ISO50 |
| LOWER THAN 270V AND NOT LOWER THAN 250V | ↑ | ISO800 | ISO200 | ISO100 |
| LOWER THAN 250V AND NOT LOWER THAN 230V | ↑ | ISO1600 | ISO400 | ISO200 |
| LOWER THAN 230V AND NOT LOWER THAN 220V | ↑ | ISO1600 | ISO800 | ISO400 |
| LOWER THAN 220V | ↑ | ISO1600 | ISO1600 | ISO800 |

IMAGING DEVICE, IMAGING METHOD AND PROGRAM

CROSS-REFERENCE TO RELATED APPLICATIONS

The present application is a Divisional Application of U.S. application Ser. No. 11/527,289, filed Sep. 26, 2006, which is based upon and claims the benefit of priority from prior Japanese Patent Application No. 2005-285739, filed Sep. 30, 2005, the entire contents of both of which are incorporated herein by reference.

BACKGROUND OF THE INVENTION

1. Field of the Invention

The present invention relates to an imaging device, an imaging method and a program particularly appropriate to a digital camera to carry out flash imaging.

2. Description of the Related Art

In general, not exclusively limited to a digital still camera or a silver film camera, but it is usual to control an imaging operation for still image imaging with a flash that is an auxiliary light source emitted. Namely, when the flash is fully emitted one time for imaging, the imaging operation is controlled so as to disable the next flash imaging until a charged state of a large-capacity capacitor to emit the flash reaches an emission allowable amount after the preceding flash imaging.

Therefore, specifically, in a state that a battery for a power source has been consumed, it takes time until the next flash imaging becomes possible after carrying out the flash imaging once, and photo opportunities are probably missed frequently.

Leaving that situation, this patent applicant proposes the following technique. Aiming at imaging an object in an appropriate luminance while reducing an affect on a battery life as much as possible, if a shutter speed to be set is slower than 1/60 second, the technique corresponds to the luminance of the object without emitting the flash with photographic sensitivity increasing. On the contrary, if the shutter speed is slower than 1/60 second although the ISO sensitivity has been maximized, the technique determines to carry out a flash emission and also determines the sensitivity. If the flash emission is determined as a necessary imaging condition in the forgoing processing, the technique lowers the sensitivity to terminate processing according to processing flow at the time of half-depression of a shutter button when the reach distance of the flash becomes not excessive to an object distance then determines the sensitivity (for instance, patent document 1: Jpn. Pat. Appln. KOKAI Publication No. 2005-204120).

PROBLEM TO BE SOLVED BY PRESENT INVENTION

The technique has been described in the aforementioned patent document 1 suppresses the consumption of the battery by suppressing emission driving of a flash in the case in which the technique can correspond to a luminance intensity of the object with sensitivity up to a settable maximum sensitivity. However, if the battery has been consumed and if imaging which needs the flash emission is performed, the technique still dose not solve a defect such that there is every possibility of taking a time to charge the flash and missing a photo opportunity.

BRIEF SUMMARY OF THE INVENTION

An object of the present invention is to provide an imaging device, an imaging method and a program capable of performing imaging without missing a photo opportunity.

An imaging device according to a preferred aspect of the present invention includes imaging means for imaging an object, an auxiliary light source which synchronizes with imaging by the imaging device to emit a flash having not less than prescribed luminance in a state not less than a prescribed charged state by power to be charged, determining means for determining a charging amount from a charged state of the auxiliary light source, and image control means for performing imaging by using the auxiliary light source with imaging sensitivity of the imaging means increased in response to the charging amount in imaging by the imaging means.

An imaging method according to another preferred aspect of the present invention of an imaging device equipped with an imaging unit which images an object, and an auxiliary light source which synchronizes with imaging by the imaging unit to emit a flash having not less than prescribed luminance in a state not less than a prescribed charged state by power to be charged, the imaging method includes a determining step of determining a charging amount from the charged state of the auxiliary light source, and an imaging control step of increasing imaging sensitivity of the imaging unit in response to the charging amount to perform imaging by using the auxiliary light source in imaging by the imaging unit.

A program according to another preferred aspect of the present invention to be executed on a computer built in an imaging device equipped with an imaging unit which images an object, and an auxiliary light source which synchronizes with imaging by the imaging unit to emit a flash having not less than prescribed luminance and at not less than a prescribed charged state by power to be charged, the program includes a determining step of determining a charging amount from the charged state of the auxiliary light source, and an imaging control step of increasing imaging sensitivity of the imaging unit in response to the charging amount to perform imaging by using the auxiliary light source in imaging by the imaging unit.

Thereby, it becomes possible to perform the imaging without missing the photo opportunity.

DETAILED DESCRIPTION OF THE INVENTION

First Embodiment

Hereinafter, first embodiment in the case in which the present invention is applied to a digital camera will be described with reference to the drawings.

Figure 1:
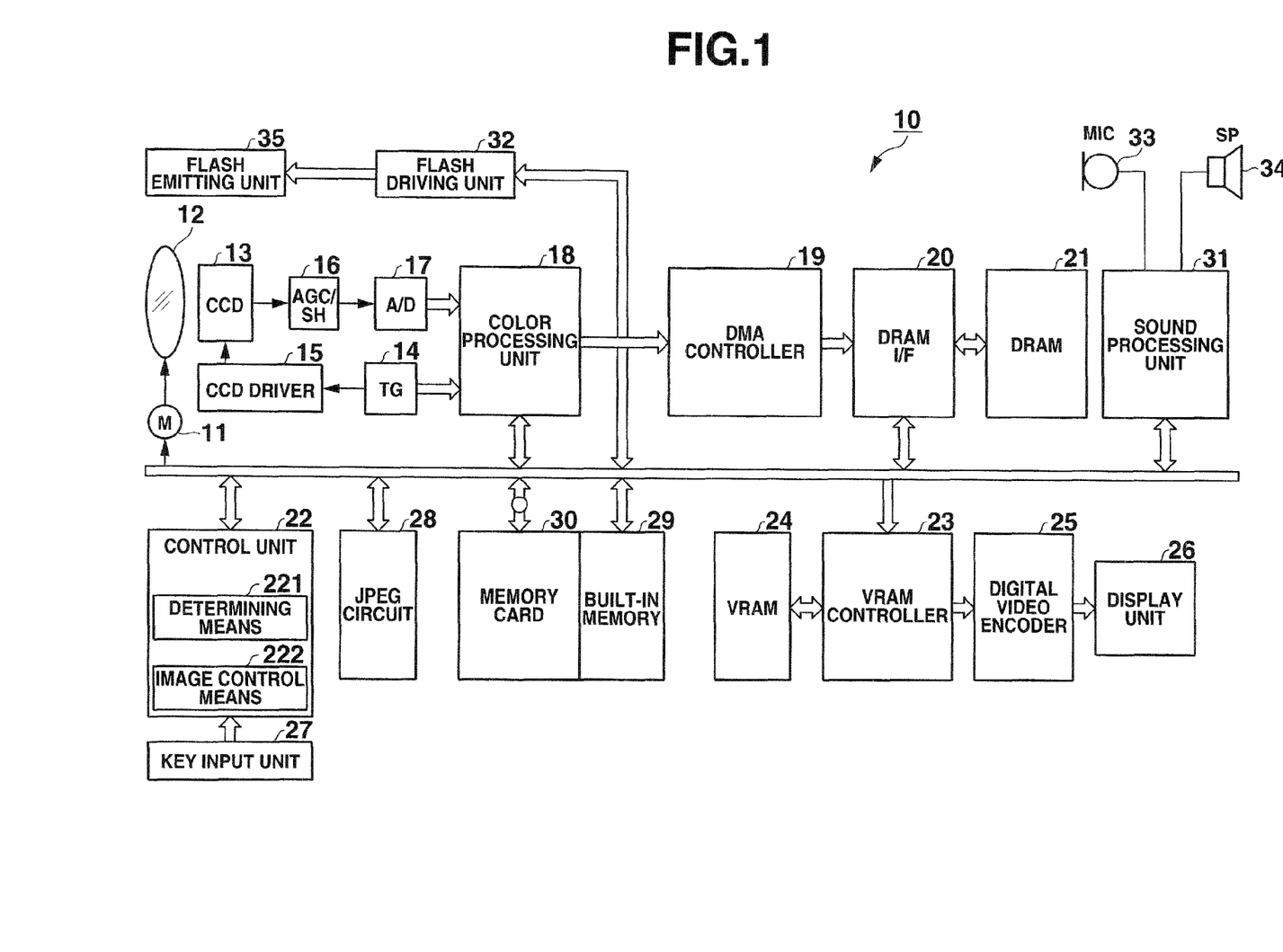
FIG. 1 is an exemplary block diagram illustrating a functional configuration of an electronic circuit of a digital camera regarding a first embodiment of the present invention.

FIG. 1 shows a conceptual configuration of an electronic circuit of a digital camera 10.

In FIG. 1, in a monitoring state in an imaging mode, positions of a part of lenses in an imaging lens optical system 12, more specifically, positions of a zoom lens and a focus lens are arbitrarily moved by means of driving of a motor (M) 11. A charge-coupled device (CCD) 13 that is a solid imaging device is disposed at an imaging position at the rear of the imaging axis of the optical system 12 thorough a not shown mechanical shutter.

The CCD 13 is scanning-driven by a timing generator (TG) 14 and a CCD driver 15 to output a photo-electrically converted output by one screen corresponding to an optical image formed for each fixed period.

An auto gain control/sample hold (AGC/SH) circuit 16 sample-holds the photo-electrically converted output for each three fundamental color of RGB in a state of signals of analog values after gain-adjusting in response to the ISO sensitivity set at that time point to transmit it to an ANALOG-TO-DIGITAL converter 17.

The ANALOG-TO-DIGITAL converter 17 converts image data of a hole into digital data in accordance with an image size and an image quality set at that time point to output it to a color processing unit 18.

The color processing unit 18 performs a color process processing including a pixel interpolation processing and a γ interpolation processing to digital pixel data and generates a brightness signal Y and color difference signals Cb and Cr of digital values to output them to a direct memory access (DMA) controller 19.

The DMA controller 19 writes in the brightness signal Y and the color difference signals Cb and Cr output from the color processing unit 18 into a buffer inside the DMA controller 19 once by using a composite synchronous signal, a memory writing enable signal and a clock signal similarly output from the process circuit 18 to conduct DMA transfer to a DRAM 21 used as a buffer memory via a DRAM interface 20.

A control unit 22 is composed of a CPU, a nonvolatile memory such as a flash memory with an operation program, including a flash emission and enhancement of sensitivity in the below-mentioned time of imaging, fixedly stored therein and a RAM used as a work memory. The control unit 22 controls a control operation of the whole of the digital camera 10.

The operation program executed by the control unit 22 includes a determining means 221 and an image control means 222.

After completing the DMA transfer of the brightness signal Y and the color difference signals Cb and Cr to the DRAM 21, the control unit 22 reads out them from the DRM 21 via the DRAM interface 20 to writes in them in a VRAM 24 through a VRAM controller 23.

A digital video encoder 25 periodically reads out the brightness signal Y and the color difference signals Cb and Cr from the VRAM 24 through the VRAM controller 23 and generates a video signal on the basis of such data to output it to a display unit 26.

The display unit 26 consists of, for instance, a color liquid crystal panel with a backlight and its driving circuit disposed on the housing rear face of the digital camera 10. In the imaging mode, it functions as an electronic finder, and reproduction-displays selected image, etc., at the time of a reproduction mode while monitor-displaying in real time an image based on image information already taken from the video encoder 25 at that time point with a display based on the video signal from the video encoder 25 displaying.

Like this manner, in a display state of a so-called through image in which an image at that time point is displayed on the display unit 26 as a monitor image in real time, operating a shutter button composing a part of a key input unit 27 at the timing that still image photographing is desired to be done generates a trigger signal.

The control unit 22 stops the DMA transfer of the brightness signal Y and the color difference signals Cb and Cr by one screen taken from the CCD 13 at that time point in response to the trigger signal to the DRAM 21. The control unit 22 newly drives the mechanical shutter (not shown) and the CCD 13 at a shutter speed in accordance with appropriate exposure conditions to obtain a start-up signal and a color difference signal by one screen. The control unit 22 transfers them to the DRAM 21, then after this, stops the path to transit to a storage state.

In the storage state, the control unit 22 reads out the brightness signal Y and the color difference signal Cb and Cr by one frame written in the DRAM 21 in units referred to as basic blocks of height 8-pixel by width 8-pixel for each component of Y, Cb and Cr via the DRAM interface 20 to write in them in a joint photograph coding experts group (JPEG) circuit 28. The JPEG circuit 28 encodes them by means of a data compression processing such as an adaptive discrete cosine transform (ADCT) and a Huffman coding that is an entropy coding method.

The control unit 22 then reads out the obtained coded data as a data file by one image from the JPEG circuit 28 and writes in it in a built-in memory 29 that is a storage medium of the digital camera 10 or in a memory card 30 detachably mounted on the digital camera 10.

With the completion of writing of compression processing of the brightness signal Y and the color difference signals Cb and Cr by one frame and of writing of the whole of the compressed data in the built-in memory 29 or the memory card 30, the control unit 22 starts up again the path from the CCD 13 to the DRAM 21.

Here, it is presumed that the memory card 30 takes a priority over the built-in memory 29 and the memory card 30, and writes and reads out a variety of items of data from image data of a still image down. That is, in a state in which the memory card 30 has been removed from the digital camera 10 and is not present, the digital camera 10 writes in and/or reads out the data to and from the built-in memory 29, and otherwise, in the state in which the memory card 30 is mounted thereon, it writes in and/or reads out the data to and from the memory card 30.

The key input unit 27, a sound processing unit 31 and a flash driving unit 32 are connected to the connecting unit 22.

The key input unit 27 is composed of a power source key, zoom key, imaging mode key, reproduction mode key, cursor key, set key, menu key, macro key, flash key, etc., in addition to the aforementioned shutter button, and signals with those key operations are transmitted to a direct control unit 22.

The sound processing unit 31 has a sound source circuit such as a PCM sound source to digitize a sound signal input from a microphone unit (MIC) 33 disposed on the front face of the housing body of the digital camera 10 in recording the sound. The processing unit 31 generates a sound data file with data compressing in accordance with a predetermined data file form, for instance, the moving picture coding experts group-1 audio layer 3 (MP3) standards, and outputs it to the built-in memory 29 or memory card 30. On the other hand, in reproducing the voice, the digital camera 10 decompresses the sound data file read out from the built-in memory 29 or the memory card 30 to analog-convert it and drives a loudspeaker unit (SP) 34 disposed on the rear face side of the digital camera 10, in the same manner as the display unit 26 is disposed, to amplify and output it.

The flash driving unit 32 charges the not shown large-capacity capacitor for the flash in imaging the still image, then, flash-drives a flash emitting unit 35 composed of a xenon discharge lamp, etc., on the basis of the control from the control unit 22.

However, in the case in which imaging of not a still image but a motion image is selected in the imaging mode, at the time when the shutter button is operated for the first time, the control unit 22 starts to continuously execute a series of operations for obtaining the still image data to compress it by means of the JPEG circuit 28 and storing it in the built-in memory 29 or the memory card 30 at an appropriate frame rate, for example, 30 frame/sec. And then at the time when the shutter button is operated for the second time, or after the elapse of a prescribed limited time, for instance, 30 seconds, the digital camera 10 integrates the series of the still image data files to reset them as a data file of a motion JPEG (AVI file).

In the reproduction mode, the control unit 22 selectively reads out the image data stored in the built-in memory 29 or the memory card 30, the JPEG circuit 28 expands the image data compressed through the absolutely opposed procedure to the procedure of the data compression in the imaging mode to store the expanded image data on the DRAM 21 via the DRAM interface 20. The control unit 22 then stores the content stored in the DRAM 21 onto the VRAM 24 via the VRAM controller 23. The encoder 25 reads out the image data periodically from the VRAM 24 to generate the video signal then reproduces it on the display unit 26.

If the selected image data is not the still image but the motion image, the control unit 22 continuously executes the reproduction of each still image data consisting of the selected motion image file in prescribed frames in terms of time. At the time when the reproduction of the last still image data is completed, the control unit 22 performs a reproduction-display by using only the still image data positioned at a top until an instruction for the next reproduction will be issued.

Operations of the foregoing embodiment will be described below.

Like generic other cameras, it is assumed that, in the digital camera 10, the shutter button has an operation stroke of two stages to execute an imaging operation based on operation logic as follows. Namely, as a first stage, the digital camera 10 executes an operation up to a half extent of a full stroke and a automatic focusing (AF) processing and an automatic exposure (AE) processing in an operation state generally referred to as the half-depression of the shutter button to lock each processing value. And after this, as a second stage, it executes regular imaging depending on the AF value and AE value in an operation state of the full stroke, generally referred to as full-depression of the shutter button.

Figure 2:
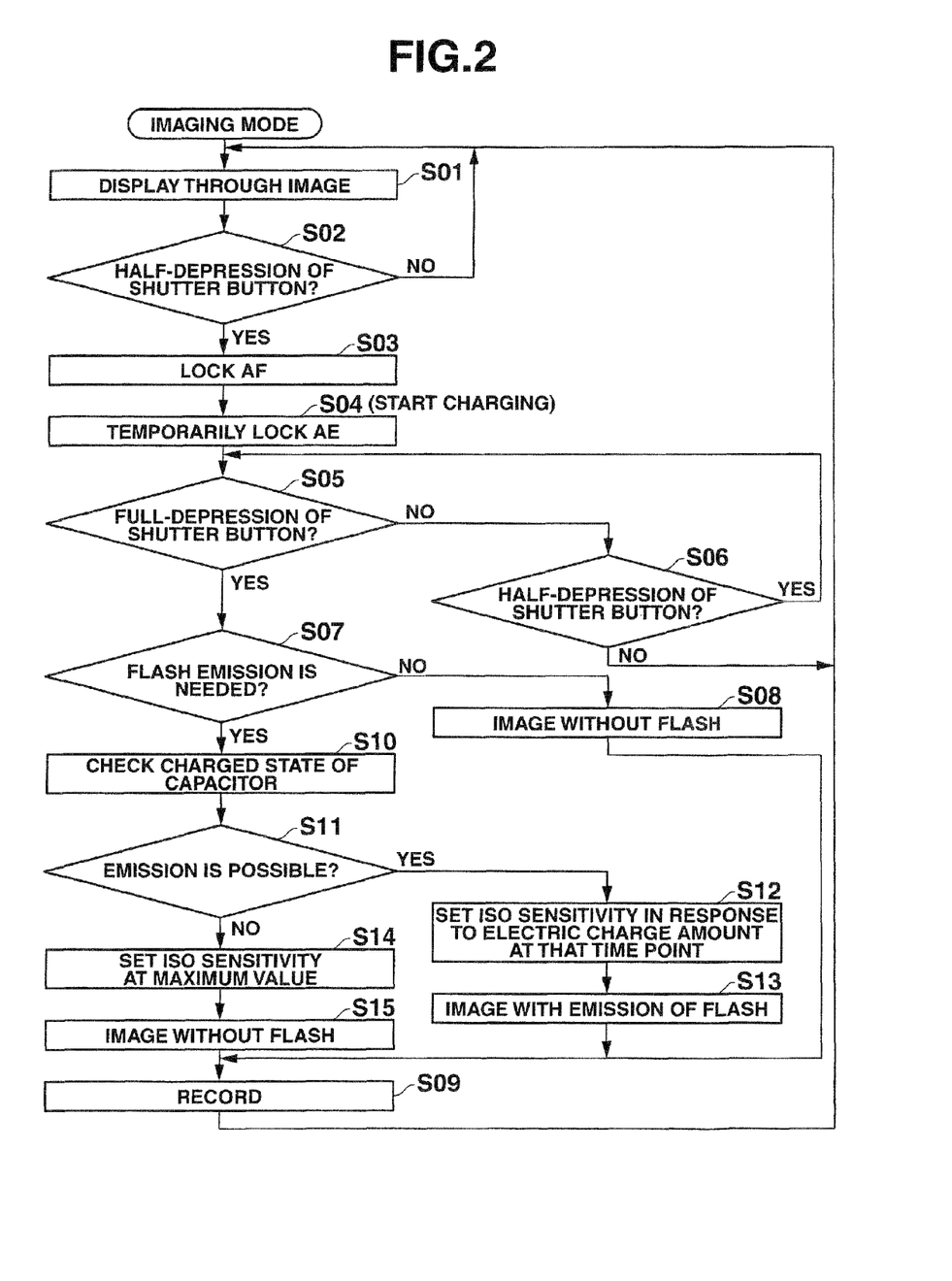
FIG. 2 is an exemplary flowchart illustrating a processing content in imaging mode regarding the first embodiment.

FIG. 2 shows a content of a processing executed in the case in which the digital camera 10 images the still image in the imaging mode, and the processing is basically executed on the basis of the control by the determining means 221 and photographing control means 222 of the control unit 22.

At the beginning, the digital camera 10 executes the simple AF processing and AE processing so as not to exceed the prescribed frame rate, for instance, the rate of 30 frames per second, at the point of time to continuously drives the CCD 13 at a quick shutter speed in consideration of the frame rate. So that the digital camera 10 stands ready for the shutter button to be brought into the half-depression state by repeatedly executing the following processing. Namely, the digital camera determines whether or not the shutter button of the key input unit 27 is brought into the half-depression operation (step S02) while maintaining a state of a through image display of displaying the content imaged by the CCD 13 onto the display unit 26 (step S01).

The digital camera 10 determines the fact of half-depression of the shutter button in step S02, and then, moves the focus lens in the imaging lens optical system 12 so as to focus on an image center obtained at the point of that time to lock up the lens (AF lock). On the other hand the digital camera 10 notifies the execution of the AF lock to the user by amplifying and outputting an electronic sound such as "peep" through a loudspeaker unit 34 (step S03).

Simultaneously, the digital camera 10 obtains an appropriate exposure value from a state in which the automatically focused position is locked and sets an aperture value and a shutter speed from the exposure value to temporarily lock them (step S04). Further, the digital camera 10 repeatedly determines whether or not the shutter button has been fully depressed (step S05), or it has been still in the half-depressed state or not (step S06). As the determination results, the digital camera 10 stands ready until the shutter will be fully depressed or the state of a half-depression state thereof will be released, while locking each state of the AF and AE.

The charging for the capacitor (not shown) is not limited to the case in which it is conducted at the timing of the AE temporal lock (step S04), it may be conducted at the timing of switch over to the imaging mode or after the flash emission, for instance, so as to forcedly emit the flash.

After releasing the half-depression operation of the shutter button, the digital camera 10 determines the fact in step S06, determines that it has not gotten to the regular imaging then returns to the processing on and after step S01 again.

If the shutter button is fully depressed from the state where the AF value and the AE values are locked, the digital camera 10 determines the fact in step S05, then, it determines whether or not the emission from the flash emitting unit 35 is required from the AE value locked in the right before step S04 (step S07).

Here, in the case in which it is determined that there is outside light of a light amount sufficient to the object to such an extent that the emission from the emission by the flash emitting unit 35 is not needed, the digital camera 10 directly executes imaging in accordance with the AF value and the AE value which have been locked in the steps S03 and S04 without having to emit from the flash emitting unit 35 (step S08). After quickly recording the image data obtained through the imaging onto the built-in memory 29 or the memory card 30 followed by compressing that image data (step S09), the digital camera 10 returns to the processing on and after step S01 to prepare for the next imaging.

In the case in which it is determined that the emission by the flash emitting unit 35 is necessary in step S07, the flash driving unit 32 checks the charged state onto the capacitor (not shown) for the emission from the flash emitting unit 35 at that time point to output the information showing the checking result to the control unit 22 (step S10).

Figure 3:
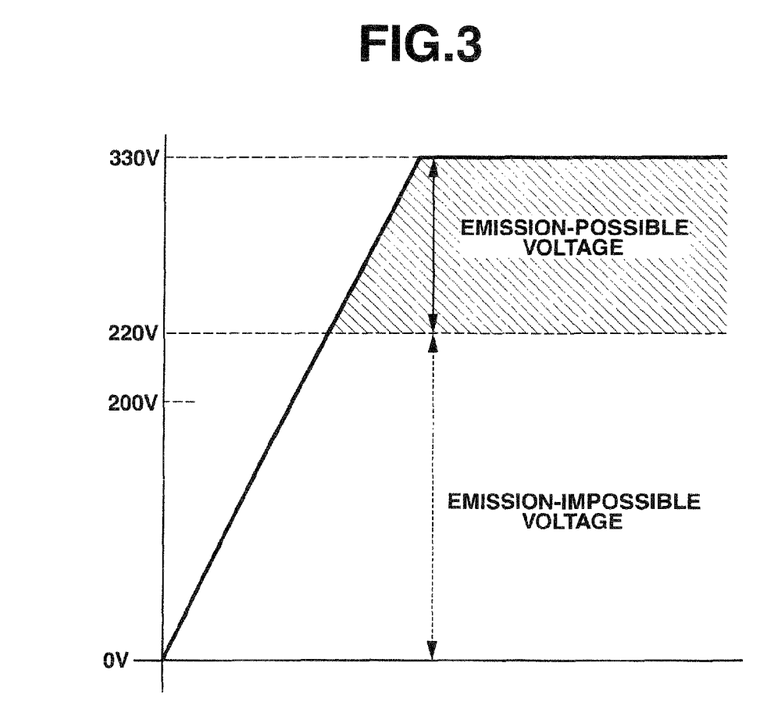
FIG. 3 is an exemplary view exemplifying a charging property of a large-capacity capacitor for a flash regarding the first embodiment.

FIG. 3 exemplifies a charging property to the capacitor from the flash driving unit 32 to flash-drive the flash emitting unit 35. Here, it is supposed that it becomes possible to flash-drive the flash emitting unit 35 when an applied voltage to the xenon discharge tube composing of the flash emitting unit 35 due to the electric charge amount charged in the capacitor is 220V or more. Also it is supposed that the getting to 330V causes full charging up to an upper limit value then the charged state is maintained.

According to the checking result of the charged state of the capacitor at that time point, it is determined whether or not the charged state is enough for the flash from the flash emitting unit 35, here, whether or not the applied voltage is 220V or more (step S11).

If it is determined that the flash emitting unit 35 has been possible to make the flash, the digital camera 10 sets an ISO sensitivity in response to the charged state at the time of the checking, more specifically, sets an amplification rate to the image signal with the analog value in the AGC/SH circuit 16 (step S12), then, it performs the imaging by making the flash emitting unit 35 emit with the light amount possible to be emitted at that time point (step S13).

Figure 4:
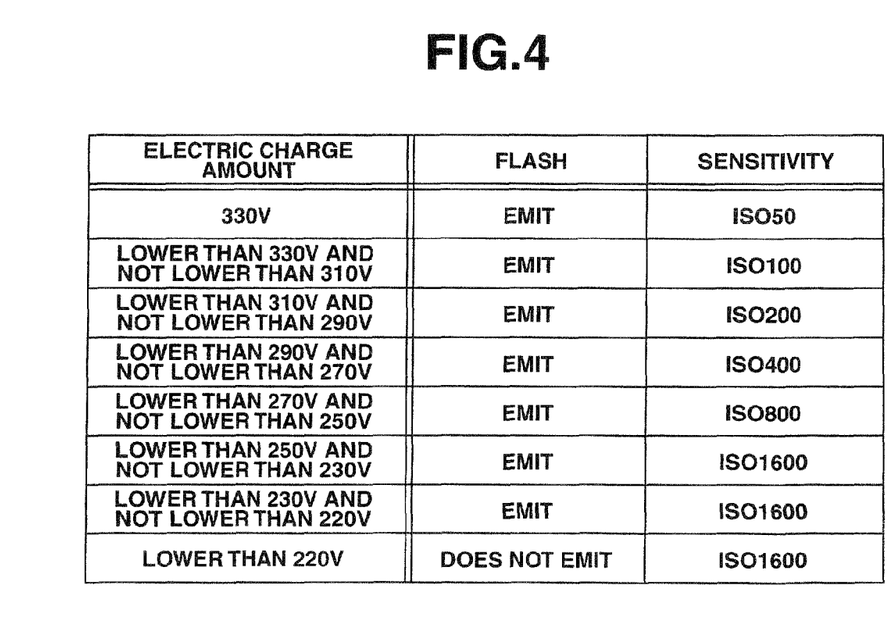
FIG. 4 is an exemplary view exemplifying a content of a look-up table defining a presence or absence of a flash emission and ISO sensitivity corresponding to an amount of stored electric power regarding the first embodiment.

FIG. 4 exemplifies the content in the look-up table to which the control unit 22 refers at that time, and in the case where the voltage of the capacitor is set in a range of 200 to 330V; it controls to set the ISO sensitivities in a rage of 1,600-50 step by step to perform the imaging.

The digital camera 10 then makes the flash emitting unit 35 emit with the light amount possible to be emitted at that time point in step S13, and after quickly recording the image data obtained by the imaging onto the built-in memory 29 or the memory card 30 followed by compressing the image data (step S09), then, it returns to the processing on and after step S01 in order to prepare the next imaging.

If it is determined that the charged state of the capacitor by means of the flash driving unit 32 in step S11 is the state in which the flash emitting unit 35 is disabled to emit, here, it is determined that the applied voltage is lower than 220V, the control unit 22 sets the ISO sensitivity to a maximum value (wherein, 1,600V as shown in FIG. 4) (step S14) then the digital camera 10 conducts the imaging without the emission from the flash emitting unit 35 (step S15).

Then, after quickly recording the image data obtained through the imaging onto the built-in memory 29 or the memory card 30 with the image data compressed (step S09), the digital camera 10 returns to the processing on and after step S01 to get itself ready for the next imaging.

Like processing above mentioned, even if the capacitor to make the flash emitting unit 35 emit that is an auxiliary light source is not in the fully charged state, if the capacitor is enabled to emit, the digital camera 10 determines the state. The digital camera 10 then quickly sets so as to enhance the ISO sensitivity, and it can shift to the imaging operation accompanied by the emission through the flash emitting unit 35. So that, the digital camera 10 can shift to immediate imaging after operating the shutter button without taking time to charge the flash, and becomes possible to execute imaging without missing any shutter opportunity.

Even if the state of the capacitor to emit the flash emitting unit 35 is far from its fully charged state, and it is determined that the emission is impossible, the digital camera 10 sets the ISO sensitivity to the maximum value then shifts to the imaging operation without a flash emission, so that it can image without missing the shutter opportunity despite the fact that the obtained image is affected by noise.

In the foregoing embodiment, it is assumed that every determination of the possibility of the flash emission corresponding to the charged state and the setting of the ISO sensitivity are determined by referring to the look-up table stored in the nonvolatile memory in the control unit 22 together with the operation program.

Thereby, not only providing the enhanced sensitivity of the imaging can be achieved quickly through the simple circuit configuration, but also providing version up of individual differences of each components consisting of the digital camera 10 and the product thereof become possible. Furthermore, easily rewriting its stored contents is made possible in response to customizing by the user.

Second Embodiment

Hereinbelow, a second embodiment in the case in which the present invention is applied to a digital camera will be described with reference to the drawings.

Since a conceptual configuration of an electronic circuit of the digital camera 10 regarding the second embodiment is basically same as that illustrated in FIG. 1, the similar units will be put the similar reference marks and their illustration and explanation will be omitted.

In the second embodiment, it is presumed that the imaging lens optical system 12 or the CCD 13 has a function of a camera-shake correcting of images due to a hand movement, more specifically, a method for displacing an imaging light axis of the optical system 12, or a method for moving an imaging range in an imaging region of the CCD 13, and the like.

In addition, in a state in which an acceleration sensor (not shown in FIG. 2) to detect the displacement of the light axis within a frequency range of, for instance, 5 to 50 Hz to two directions each perpendicular to the imaging light axis of the optical system 12 is disposed and the camera-shake correcting mode of the images due to the hand movement avoids setting differences, it is supposed that the digital camera 10 may image sharp image data with an affect of the camera-shake of the images due to the hand movement avoiding.

Next to this, operations of e second embodiment will be set forth.

Also in the digital camera 10, like the generic other cameras, the shutter has the operation stroke of two stages and executes imaging operations based on the operation logic as follows. That is, as the first stage, the operation to the half extent of the full-stroke, which locks each processed value by executing the AF processing and the AE processing in the operation state generally referred to as the half depression; and after this, the full-stroke operation as the second stage, which executes regular imaging based on the AF value and the AE value in the operation state generally referred to as the full-depression.

Figure 5:
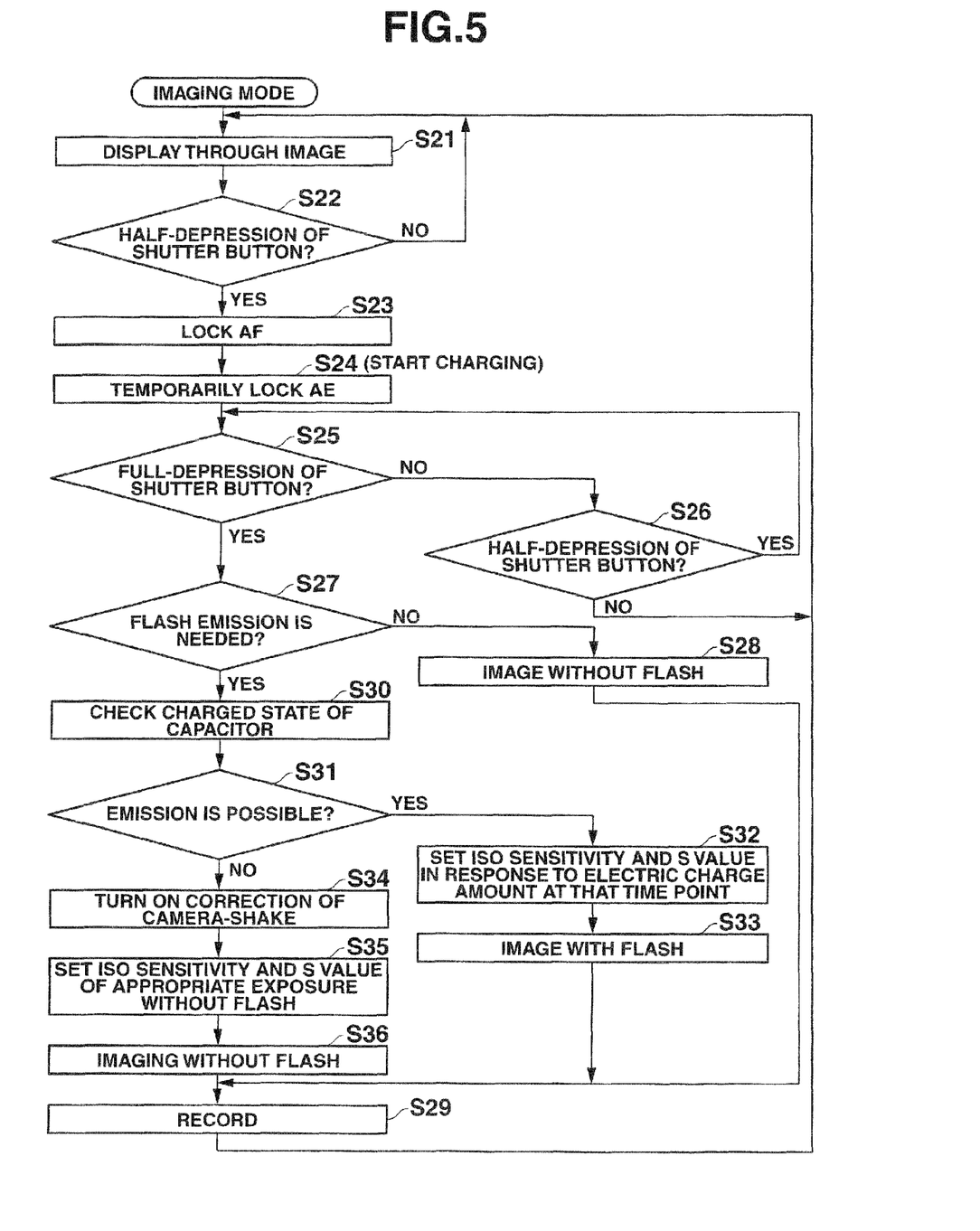
FIG. 5 is an exemplary flowchart illustrating a processing content in an imaging mode of a digital camera regarding a second embodiment of the present embodiment.

FIG. 5 illustrates a content of a processing executed in the case of imaging of a still image in an imaging mode, and the processing is basically executed on the basis of the control by the determining means 221 and the image control means 222 of the control unit 22.

At the beginning, the digital camera 10 stands ready for becoming the state of the half-depression of the shutter button with repeated executions of the processing such that determining whether or not the shutter button of the key input unit 27 has been operated with the half-depression (step S22), while maintaining a state of a through image display displaying the content imaged by the CCD 13 on the display unit 26, by executing such simple AF processing and AE processing that fall with a prescribed frame rate, for instance, 30 frame/sec at that point of time, and by continuously driving the CCD 13 at a high shutter speed with taking account of the frame rate (step S21).

Then, in step S22, it is determined the fact of the half-depression operation of the shutter button, the digital camera 10 moves the focus lens in the imaging lens optical system 12 so as to focus on the center of the image obtained at that point of time to lock the lens (AF lock). On the other hand, the digital camera 10 notifies the execution of the AF lock to the user by, for example, amplifying and outputting the electric sound like a "peep" sound through the loudspeaker unit 34 (step S23).

Simultaneously, the digital camera 10 obtains the appropriate exposure value from the state of locking of the automatically focused position and further sets the aperture value and shutter speed from the exposure value to temporarily lock them (step S24). The digital camera 10 then stands ready for the shutter button to be full-depression operated or for the state of half-depression operation to be released while locking each state of the AF and AE by repeatedly determining whether the shutter button is further full-depression operated or not (step S25), and whether the half-depression operation sill maintained or not (step S26).

If the emission from the flash emitting unit 35 is required from the AE value temporarily locked in step S24, the flash driving unit 32 immediately starts the charging to the capacitor (not shown).

It is not limited for the charging to the capacitor to be performed at the timing of the AE tentative locking (step S24), it may be performed at timing of changeover to the imaging mode or after the emission the flash, for instance, so as to forcibly emit the flash.

When the half-depression operation of the shutter button is released, the digital camera 10 determines the fact in step S26, determines that it has not gotten to the regular imaging, and returns to the processing on and after step S21 again.

When the shutter button is full-depression operated from the state in which the AF value and AE value have been locked, the digital camera 10 determines the fact in step S25, then, it determines whether or not the emission by the flash emitting unit 35 is required from the AE value locked in the right before step S24 (step S27).

Here, if it is determined that outside light of a light amount sufficient to an object is incident to the extent that the emission from the flash emitting unit 35 is not necessary, the digital camera 10 performs imaging in accordance with the AF value and the AE value locked in the steps S23 and S24, respectively, without the emission from the flash emitting unit 35 with leaving the outside light as it is (step S28). The digital camera 10 then returns to the processing on and after step S21 to prepare the coming imaging after quickly recording the image data obtained through the imaging onto the built-in memory 29 or the memory card 30 followed by compressing the image data (step S29).

In the event in which it is determined that the emission from the flash emitting unit 35 is necessary in step S27, the flash driving unit 32 checks the charged state to the capacitor (not shown) to emit the flash emitting unit 35 at that point of time to output the information showing the checking result to the control unit 22 (step S30).

FIG. 3 exemplifies a charging property to the capacitor by the flash driving unit 32 for flash-driving the flash emitting unit 35. Here, it is presumed that it becomes possible to flash-drive the flash emitting unit 35 in the case in which the applied voltage to the xenon discharge tube composing the flash emitting unit 35 is not lower than 220V due to the electric charge amount charged to the capacitor, and also that the capacitor will be fully charged up to the upper limit value to maintain the charged state in the case in which the applied voltage reaches 330V.

As the checking result of the charged state of the capacitor at that point of time, it is determined whether or not the charged state is possible to emit the flash emitting unit 35, here; it is determined whether the applied voltage is not lower than 220V or not (step S31).

If the flash emitting unit 35 determines that it enables its emission, in addition to set the ISO sensitivity in response to the charged state at that point of time when the check is performed, particularly to set the amplification rate to the image signal with the analog value in the AGC/SH circuit 16 and the shutter speed if necessary (step S32), the digital camera 10 makes the flash emitting unit 35 emit light with the light amount possible to be emitted at that point of time to perform the imaging (step S33).

If it is determined that the flash emitting unit 35 may emit light, the digital camera 10 may make the flash emitting unit 35 emit light with the light amount possible to be emitted at that point of time without setting the ISO sensitivity to execute the imaging. The digital camera 10 may not determine whether the flash emitting unit 35 is in the state of the possibility of its emission but may determine that the capacitor is fully charged or not.

Figure 6:
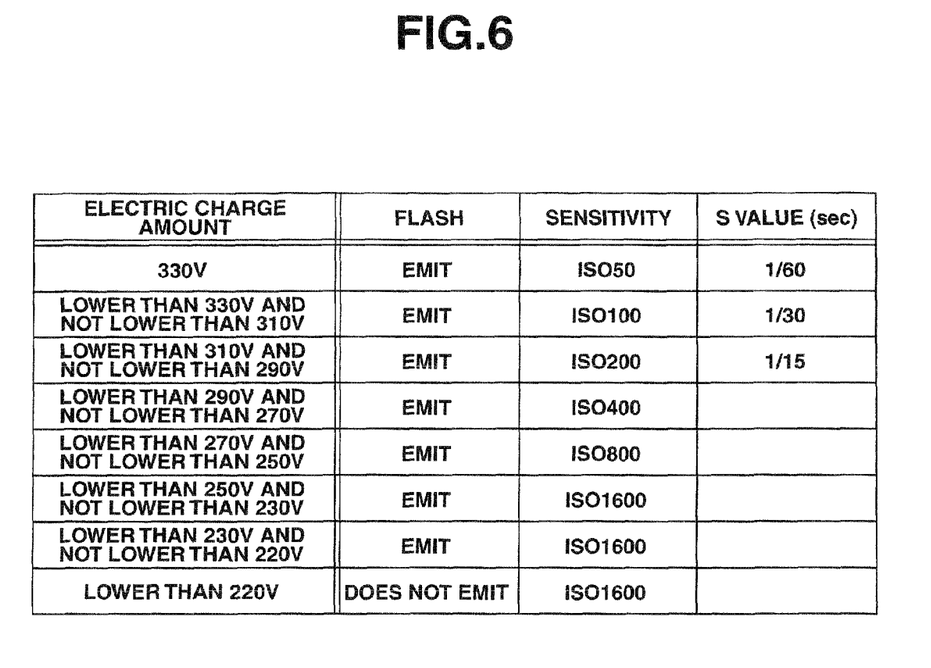
FIG. 6 is an exemplary view exemplifying a content of a look-up table defining a presence or absence of a flash emission, ISO sensitivity and a shutter speed (S value) corresponding to an amount of stored electric power regarding the second embodiment.

FIG. 6 exemplifies the content of the look-up table referred by the control unit 22 in such case, and in the case of the applied voltage to the capacitor is in the rage of 220 to 330V, the digital camera 10 sets the ISO sensitivities step by step in the range of 1,600 to 50. In the case of the applied voltage to the capacitor is further higher range of 290 to 330V, the digital camera 10 sets the shutter speeds step by step in a range of $\frac{1}{15}$ sec to $\frac{1}{60}$ sec to perform the imaging.

In step S33, when emitting the flash emitting unit 35 with the light amount possible to be flashed at that point of time to perform the imaging, after quickly recording the image data obtained by the imaging on the built-in memory 29 or the memory card 30 followed by the compressing the image data (step S29), the digital camera 10 returns to the processing on and after step S21 to prepare for the next imaging.

In step 331, if it is determined that the charged state of the capacitor by the flash driving unit 32 is the state disabling the flash emitting unit 35 to be flashed, wherein if it is determined that the applied voltage is not higher than 220V, after automatically turning on the camera-shake correcting mode of the images due to the hand movement by the optical system 12 or the CCD 13 (step S34), the digital camera 10 sets the ISO sensitivity to the maximum value (wherein, 1,600 as shown in FIG. 6). Further, the digital camera 10 sets the shutter speed (S value) based on the appropriate exposure at the ISO sensitivity value (step S35), then, it conducts the imaging without emitting the flash emitting unit 35 (step S36).

Successively, after recording quickly the image data obtained by the photographing onto the built-in memory 29 or the memory card 30 followed by compressing the image data (step S29), the digital camera 10 returns to the processing on and after step S01 to prepare for the next imaging.

Like such a manner, in the case where the flash emitting unit 35 that is the auxiliary light source cannot be emitted, it becomes possible to surely image with avoiding the camera-shake of the images due to the hand movement even in imaging by shuttering at a low speed without the flash emission. Further, this assured imaging can be conducted by automatically setting the camera-shake correcting mode of the images due to the hand movement and by setting the shutter speed to obtain the appropriate exposure in addition to the setting of the ISO sensitivity at the maximum value.

In the second embodiment, it is assumed that the digital camera 10 determines all the determinations of the possibility of the emission of the flash corresponding to the charged state and the setting of the ISO sensitivity and of the shutter speed in a part of the range by referring to the look-up table stored on the nonvolatile memory in the control unit 22 together with the operation program.

Thereby, not only providing the improved sensitivity of the photographing can be achieved quickly through the simple circuit configuration, but also providing version up of individual differences of each components consisting of the digital camera 10 and the product thereof can be achieved. Furthermore, easily rewriting its stored contents in response to customizing by the user can be made.

Third Embodiment

In the following, referring to the drawings, a third embodiment in the case in which the present invention is applied to a digital camera will be explained.

Since a conceptual configuration of an electronic circuit of the digital camera 10 regarding the third embodiment is basically same as that illustrated in FIG. 1, the similar units will be put the similar reference marks and their illustration and explanation will be omitted.

Next, an operation of the third embodiment will be set forth.

Also in the digital camera 10, like the generic other cameras, the shutter has the operation stroke of two stages and executes imaging operations based on the operation logic as follows. That is, as the first stage, the operation to the half extent of the full-stroke, which locks each processed value by executing the AF processing and the AE processing in the operation state generally referred to as the half depression; and after this, the full-stroke operation as the second stage, which executes regular imaging based on the AF value and the AE value in the operation state generally referred to as the full-depression.

In the third embodiment, in the case of performing the flash imaging by means of the flash emitting unit 35, if an effective imaging distance to an object is set to, for instance, 10 m as maximum and when imaging the object placed in a range of 10 m to an infinitum distance, a reflective light amount enough to image and an effect resulted from the flash emission are not expected, so that the imaging by using the flash emitting unit 35 is not performed.

Figure 7:
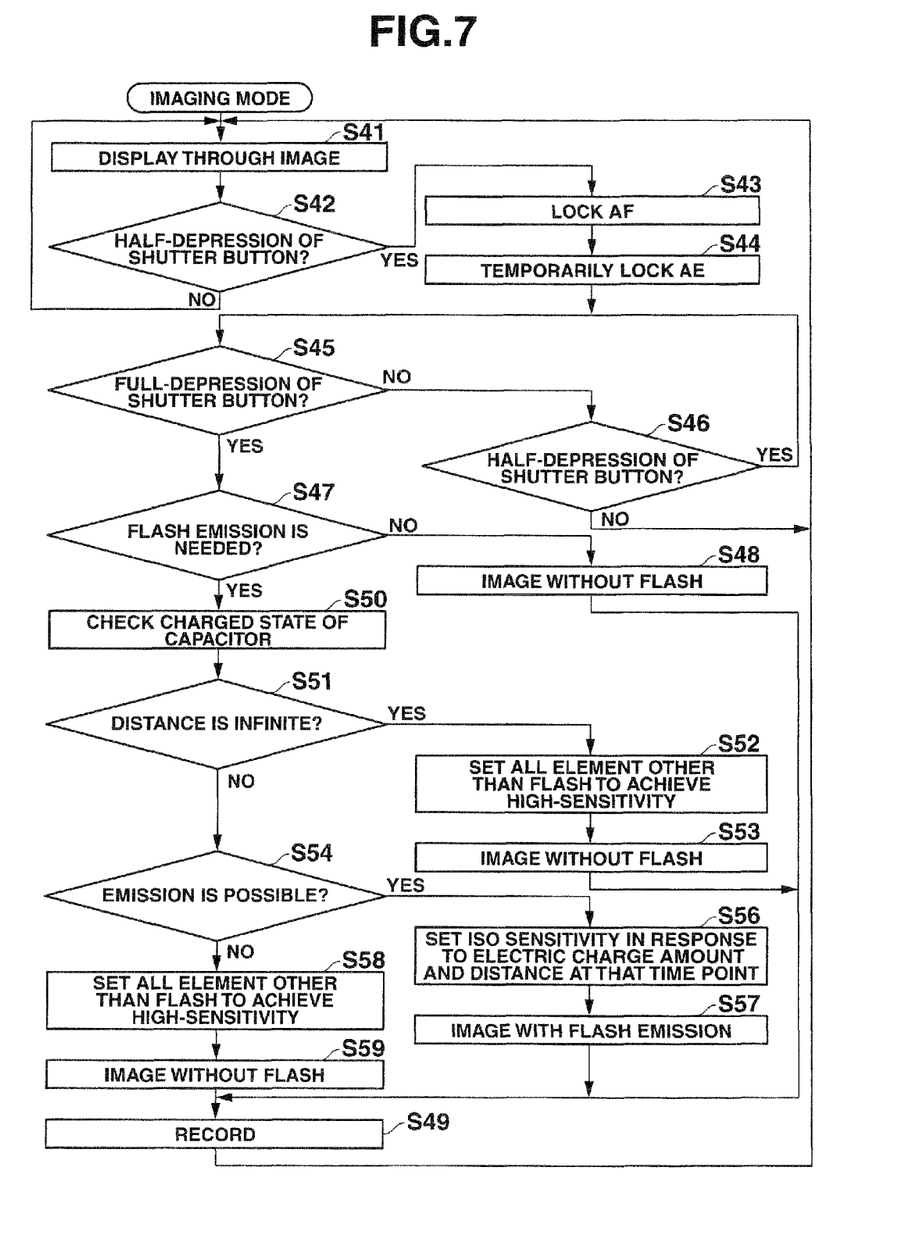
FIG. 7 is an exemplary flowchart illustrating a processing content in an imaging mode of a digital camera regarding a third embodiment of the present invention.

FIG. 7 shows a content of a processing in the case of imaging a still image in an imaging mode, and this processing is implemented on the basis of the control through the determining means 221 and photographing control means 222 of the control unit 22.

The digital camera 10 stands ready for bringing about the state of the half-depression of the shutter, while maintaining a state of a through image display displaying the content imaged by the CCD 13 on the display unit 26, by firstly repeating executions of a simple AF processing and AE processing that fall with a prescribed frame rate, for instance, 30 frame/sec at that point of time to continuously drive the CCD 13 at a high shutter speed with taking account of the frame rate (step S41). Further, the digital camera 10 stands ready for the state of the half-depression by repeatedly executing the processing, in which the control unit 22 determines whether or not the shutter button has been operated with the half-depression (step S42).

Then, in step S42, the control unit 22 determines the fact of the half-depression operation of the shutter button, it moves the focus lens in the imaging lens optical system 12 so as to focusing on the center of the image obtained at that point of time to lock the lens (AF lock). On the other hand, the control unit 22 notifies the execution of the AF lock to the user by, for example, amplifying and outputting the electric sound like a "peep" sound through the loudspeaker unit 34 (step S43).

Simultaneously, the control unit 22 obtains the appropriate exposure value from the state of locking of the automatically focused position and further sets the aperture value and shutter speed from the exposure value to temporarily lock them (step S44). The digital camera 10 then stands ready for the shutter to be brought into full-depression operated or for the state of half-depression operation to be released while locking each state of the AF and AE by repeatedly determining whether the shutter button is further full-depression operated or not (step S45), and whether the half-depression operation sill maintained or not (step S46).

If the emission from the flash emitting unit 35 is required from the AE value temporarily locked in step S44, the flash driving unit 32 immediately starts the charging to the capacitor (not shown).

The charging to the capacitor (not shown) is not limited to be performed at the timing of the AE tentative locking (step S44); it may be performed at timing of changeover to the imaging mode or after emitting the flash, for instance, so as to forcibly flash the flash.

When the half-depression operation of the shutter button is released, the digital camera 10 determines the fact in step S46, determines that it has not gotten to the regular imaging, and returns to the processing on and after step S41 again.

When the shutter button is full-depression operated from the state in which the AF value and AE value have been locked, the digital camera 10 determines the fact in step S45. Then, it determines whether or not the emission by the flash emitting unit 35 is required from the AE value locked in the right before step S44 (step S47).

Here, if it is determined that outside light of a light amount sufficient to an object is incident to the extent that the emission from the flash emitting unit 35 is not necessary, the digital camera 10 performs imaging in accordance with the AF value and AE value locked in the steps S43 and S44, respectively, without the emission from the flash emitting unit 35 with leaving the outside light as it is (step S48). The digital camera 10 then returns to the processing on and after step S01 to prepare the coming imaging after quickly recording the image data obtained through the imaging onto the built-in memory 29 or the memory card 30 (step S49).

In the event in which it is determined that the emission from the flash emitting unit 35 is necessary in step S27, the flash driving unit 32 checks the charged state to the capacitor (not shown) to flash the flash emitting unit 35 at that point of time and outputs the information showing the checking result to the control unit 22 (step S50).

FIG. 3 exemplifies a charging property to the capacitor by the flash driving unit 32 for flash-driving the flash emitting unit 35. Here, it is assumed that it becomes possible to flash-drive the flash emitting unit 35 in the case in which the applied voltage to the xenon discharge tube composing of the flash emitting unit 35 is not lower than 220V due to the electric charge amount charged to the capacitor. It is also assumed that that the capacitor will be fully charged up to the upper limit value to maintain the charged state, in the case in which the applied voltage arrives at 330V.

As the checking result of the charged state of the capacitor at that point of time, it is determined whether or not the distance from the AF value locked in the right before step S43 to the object is within a range in which an effect caused from the flash emission is not expected (10 m to infinitum distance) (step S51).

Here, if it is determined that the distance to the object is far and the object is located in a range in which the effect brought from the flash emission is not expected, the digital camera 10 achieves to set the enhancement of all the elements including the ISO sensitivity other than the flash (step S52), then, performs the imaging without making the flash emitting unit 35 flash (step S53).

Next to such processing, after quickly compressing the image data obtained though the imaging, the digital camera 10 quickly records it on the built-in memory 29 or the memory card 30, then, returns to the processing on and after step S01 to prepare for the next imaging.

If it is determined, in step S51, that the distance up to the object is within the range in which the effect by the flash emission is expected, in succession to this, the digital camera 10 determines whether or not the result of checking of the charged state in step S50 shows the charged state in which the flash emitting unit 35 can sufficiently emit light, wherein it determines whether or not the results thereof shows the applied voltage that is higher than 220V (step S54).

If the checking results shows the possibility of the emission by the flash emitting unit 35, the digital camera 10 sets the ISO sensitivity corresponding to the charged state at the point of time of checking, more particularly, sets the amplification rate to the image signal with the analog value at the AGC/SH circuit 16 in response to the distance to the object (step S56). The digital camera 10 then performs the imaging by making flash emitting unit 35 emit light with the light amount possible to be flashed at that point of time (step S57).

Figure 8:
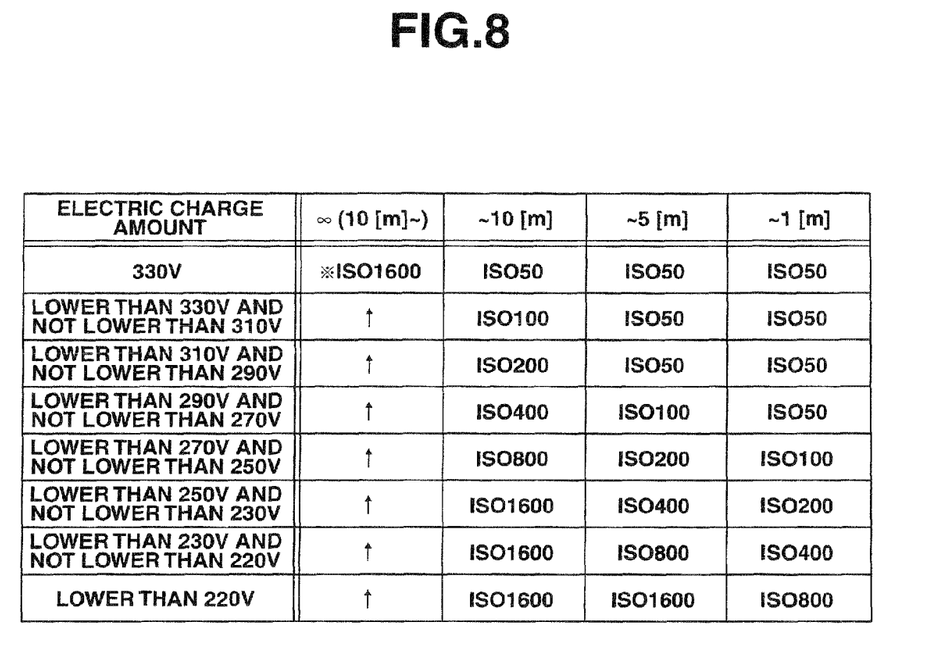
FIG. 8 is an exemplary view exemplifying a content of a look-up table defining ISO sensitivity corresponding to an amount of stored electric power and an object distance regarding the third embodiment.

FIG. 8 exemplifies the content of the look-up table referred by the control unit 22 in such case, and in the case of the applied voltage to the capacitor is in the rage of 220 to 330V, the digital camera 10 sets the ISO sensitivities step by step in the range of 1,600 to 50 to implement the imaging.

In step S57, when emitting the flash emitting unit 35 with the light amount possible to be flashed at that point of time to perform the imaging, after quickly recording the image data obtained by the imaging on the built-in memory 29 or the memory card 30 followed by the compressing the image data (step S49), the digital camera 10 returns to the processing on and after step S41 to prepare for the next imaging.

In step S54, if it is determined that the charged state of the capacitor by the flash driving unit 32 is the state disabling the flash emitting unit 35 to be flashed, wherein if it is determined that the applied voltage is lower than 220V, after achieving to set the enhancement of sensitivity of all the elements including the ISO sensitivity other than the flash (step S58) then the digital camera 10 conducts the imaging without the emission from the flash emitting unit 35 (step S59).

Next to this, after compressing the image data obtained through the imaging, the digital camera 10 quickly records the image data onto the built-in memory 29 or the memory card 30 (step S49) then retunes to the processing on and after step S41 so as to prepare the next imaging.

Like such processing, since the digital camera 10 makes the flash in spite of insufficient state even if the flash is in the charged state in which it cannot be flashed fundamentally and also forces the imaging due to the automatically set achievements of the enhancement of high sensitivity of each element, so that it may surely image in preference to the imaging intension of the user without missing the shutter opportunity.

In the above-mentioned first to third embodiments, having described that the digital camera 10 copes to achieve the enhancement of the imaging by the ISO sensitivity, particularly, copes with the amplification rate in amplifying the analog image signal by the AGC/SH circuit 16, the present invention is not limited to such coping and may cope in a pixel addition method by which additions are performed with information among adjacent pixels to increase dynamic ranges of the pixels.

Further, a pixel addition method of a plurality of pixels, by which a plurality of items of image data obtained through a plurality of times of exposures continuous in terms of time are added in pixels is possible approach.

In this case, since the image data which has been achieved its enhancement is obtained from the image data through multiple exposures, in the case in which the object moves intensively, even if the function of the correcting the camera-shake of the images due to the hand movement is operated, camera-shake is generated on the image inevitably, so that an object with less movement is essential, but image data higher in nature and higher in image quality can be obtained.

Other than this, the present invention is not limited to the aforementioned embodiments and it is possible for the invention to be implemented in a various types of modifications within a range not departing from the point of the invention.

Further, the forgoing embodiments include inventions in a variety of stages; various inventions may be extracted from appropriate combinations of a plurality of disclosed constituent components. For instance, even if some constituent components are deleted from all the constituent components shown in the embodiments, at least one of the problems has been described in the section of "problem can be solved by present invention", and in the case in which at least one effect described in the section of the "effect of the present invention" is obtained, the configuration from which the some constituent components has been deleted may be extracted as the invention.

What is claimed is:
1. An imaging device comprising:
imaging means for imaging an object;
an auxiliary light source which synchronizes with imaging by the imaging device to emit a flash having not less than a prescribed luminance when a charged state of the auxiliary light source is not less than a prescribed charged state;
determining means for determining a charging amount of the charged state of the auxiliary light source; and
imaging control means for performing imaging by the imaging means using the auxiliary light source, with an imaging sensitivity of the imaging means being increased in response to the charging amount of the charged state of the auxiliary light source;
wherein the imaging control means increases the imaging sensitivity by a pixel addition method for adding information of adjacent pixels.

2. An imaging method for an imaging device equipped with an imaging unit which images an object, and an auxiliary light source which synchronizes with imaging by the imaging unit to emit a flash having not less than a prescribed luminance when a charged state of the auxiliary light source is not less than a prescribed charged state, the imaging method comprising:
determining a charging amount of the charged state of the auxiliary light source; and
increasing an imaging sensitivity of the imaging unit in response to the charging amount of the charged state of the auxiliary light source, to perform imaging by the imaging unit by using the auxiliary light source;

wherein the increasing of the imaging sensitivity is performed by a pixel addition method for adding information of adjacent pixels.

3. A non-transitory computer-readable recording medium having a program stored thereon to be executed by an imaging device equipped with an imaging unit which images an object, and an auxiliary light source which synchronizes with imaging by the imaging unit to emit a flash having not less than a prescribed luminance when a charged state of the auxiliary light source is not less than a prescribed charged state, the program controlling the imaging device to perform functions comprising:

- determining a charging amount of the charged state of the auxiliary light source; and
- increasing an imaging sensitivity of the imaging unit in response to the charging amount of the charged state of the auxiliary light source, to perform imaging by the imaging unit using the auxiliary light source;
- wherein the increasing of the imaging sensitivity is performed by a pixel addition method for adding information of adjacent pixels.

4. An imaging device comprising:

- imaging means for imaging an object;
- an auxiliary light source which synchronizes with imaging by the imaging device to emit a flash having not less than a prescribed luminance when a charged state of the auxiliary light source is not less than a prescribed charged state;
- determining means for determining a charging amount of the charged state of the auxiliary light source; and
- imaging control means for performing imaging by the imaging means using the auxiliary light source, with an imaging sensitivity of the imaging means being increased in response to the charging amount of the charged state of the auxiliary light source;
- wherein the imaging control means obtains image data with increased sensitivity by performing pixel additions to add a plurality of items of the image data obtained by the imaging means through a plurality of times of exposures continuous in terms of time in identical pixels.

5. An imaging method for an imaging device equipped with an imaging unit which images an object, and an auxiliary light source which synchronizes with imaging by the imaging unit to emit a flash having not less than a prescribed luminance when a charged state of the auxiliary light source is not less than a prescribed charged state, the imaging method comprising:

- determining a charging amount of the charged state of the auxiliary light source; and
- increasing an imaging sensitivity of the imaging unit in response to the charging amount of the charged state of the auxiliary light source, to perform imaging by the imaging unit by using the auxiliary light source;
- wherein image data with increased sensitivity is obtained by performing pixel additions to add a plurality of items of the image data obtained by the imaging unit through a plurality of times of exposures continuous in terms of time in identical pixels.

6. A non-transitory computer-readable recording medium having a program stored thereon to be executed by an imaging device equipped with an imaging unit which images an object, and an auxiliary light source which synchronizes with imaging by the imaging unit to emit a flash having not less than a prescribed luminance when a charged state of the auxiliary light source is not less than a prescribed charged state, the program controlling the imaging device to perform functions comprising:

- determining a charging amount of the charged state of the auxiliary light source; and
- increasing an imaging sensitivity of the imaging unit in response to the charging amount of the charged state of the auxiliary light source, to perform imaging by the imaging unit using the auxiliary light source;
- wherein image data with increased sensitivity is obtained by performing pixel additions to add a plurality of items of the image data obtained by the imaging unit through a plurality of times of exposures continuous in terms of time in identical pixels.

* * * * *